United States Patent [19]

Witte

[11] 4,267,572

[45] May 12, 1981

[54] APPARATUS FOR DETERMINING THE CONCENTRATION OF THE COMPONENTS OF A SAMPLE

[75] Inventor: Wolfgang Witte, Uberlingen, Fed. Rep. of Germany

[73] Assignee: Bodenseewerk Perkin-Elmer & Co., Uberlingen, Fed. Rep. of Germany

[21] Appl. No.: 26,710

[22] Filed: Apr. 3, 1979

[30] Foreign Application Priority Data

Apr. 8, 1978 [DE] Fed. Rep. of Germany ....... 2815284

[51] Int. Cl.³ .............................................. G06F 15/20
[52] U.S. Cl. .................................... 364/498; 356/325
[58] Field of Search ................ 364/498, 499; 356/325, 356/319–324

[56] References Cited

U.S. PATENT DOCUMENTS

| Re. 29,138 | 2/1977 | Dill et al. | 364/498 X |
|---|---|---|---|
| 3,553,444 | 1/1971 | Tong | 364/498 |
| 3,717,809 | 2/1973 | Laukien | 364/498 |
| 4,093,991 | 6/1978 | Christei, Jr. et al. | 364/498 |
| 4,171,913 | 10/1979 | Wildy et al. | 364/498 X |

Primary Examiner—Edward J. Wise
Attorney, Agent, or Firm—Salvatore A. Giarratana; Edwin T. Grimes; Francis L. Masselle

[57] ABSTRACT

Apparatus for determining the concentration of the various components of a sample, which includes a spectrophotometer for receiving a sample to be analyzed and performing extinctions of the sample at a plurality of preselected wavelengths to form a sample spectrum; memory devices for storing a standard spectra of each of the individual components; circuitry for weighting the sample spectrum at different wavelengths in conformity with each of the standard spectra and providing estimated values of the concentrations of the components from the sample spectra thus weighted; circuitry for reconstructing the sample spectrum as a linear combination of the estimated values of the concentrations and the standard spectra; a subtractor for forming a difference spectrum from the sample spectrum and the reconstructed sample spectrum; circuitry for weighting the difference spectrum at different wavelengths in conformity with each of the standard spectra and providing corrective values of the concentrations of the components from the difference spectrum thus weighted, and means for reconstructing the difference spectrum as a linear combination from the corrective values of the concentrations and the standard spectra; a subtractor for forming a second difference spectrum from the first difference spectrum and the reconstructed difference spectrum; updating means for correcting the estimated values by the corrective values, and a readout device for reading out the corrected values of the concentrations of the components.

4 Claims, 3 Drawing Figures

APPARATUS FOR DETERMINING THE CONCENTRATION OF THE COMPONENTS OF A SAMPLE

The invention relates to apparatus for determining the concentrations of the various components of a sample, using its extinction spectrum.

The problem is to determine the concentrations of the individual components in a sample, which is a mixture of various constituents or components. This analysis is made on the basis of the extinction spectrum of the sample, i.e. of the extinction as a function of wavelength. This extinction spectrum, which will be called "sample spectrum" hereinbelow, can be measured by means of an absorption spectrophotometer. Each component of the sample has an extinction spectrum characteristic of the respective substance, which spectrum will be called "component spectrum" hereinbelow. At a certain observed wavelength each component will contribute to the extinction of the sample spectrum in accordance with the extinction of the component spectrum standardized to a standard concentration and with the concentration of the respective component. From the knowledge of the standardized component spectra (standard spectra) which can be measured once by means of standard solutions of the components looked for and which, therefore, are known and from the sample spectrum of an unknown sample, the concentrations of the individual components can be determined and displayed or printed consecutively.

It is known, with a sample having n components, to read the extinction values of the sample spectrum at n different wavelengths and also the extinction values of the component spectra at these n wavelengths, into a computer. The computer then computes the concentrations of the n components from a system of n equations.

With this prior art spectra analyzer, the number of equations varies with the number of components contained in the sample. In order to achieve sufficient accuracy with this method, it is advantageous to select the observed wavelengths according to the extinction spectra of the individual components, so that not only the number but also the kind of wavelengths vary from problem to problem. Finally, problems arise with prior art spectra analyzers, if unpredicted components, for example unknown contaminations or a background of unknown spectral form, are present. Then, the prior art spectra analyzer will always provide an apparently exact solution of n concentration values, the additional extinctions being distributed somehow to the extinctions of the looked-for components in accordance with the system of equations. As a result error control is not possible. It is, on the contrary, not even apparent whether there are any unpredicted components.

It is an object of the present invention to provide new and improved apparatus for determining the concentration of the components of a sample, which permits reading in the component spectra in standardized form such as, for example, in the form of magnetic cards with a fixed number of extinction values stored in digital form and measured at fixed wavelengths.

A still further object of the invention is to provide apparatus, which permits recognition of the occurrence of unpredicted components and permits estimation of errors.

To the accomplishment of the foregoing objectives, and additional objectives and advantages, which will become apparent as this description proceeds, the invention contemplates, in one form thereof, the provision of a new and improved apparatus for determining the concentration of the various components of a sample, which includes a spectrophotometer for receiving the sample to be analyzed and performing extinctions of the sample at a plurality of preselected wavelengths to form a sample spectrum. Means are provided for forming and storing a standard spectra of each of the individual components by the extinction of standard solutions of the components being looked for at said plurality of preselected wavelengths, and means are provided for weighting the sample spectrum at different wavelengths in conformity with each of the standard spectra and providing estimated values of the concentrations of the components from the sample spectra thus weighted. In addition, means are provided for reconstructing the sample spectrum as a linear combination of the estimated values of the concentrations and the standard spectra, and means are provided for forming a difference spectrum from the sample spectrum and the reconstructed sample spectrum. The apparatus further includes means for weighting the difference spectrum at different wavelengths in conformity with each of the standard spectra and providing corrective values of the concentrations of the components from the difference spectrum thus weighted, and means for reconstructing the difference spectrum as a linear combination of the corrective values of the concentrations and the standard spectra. Further, means are provided for forming a second difference spectrum from the first difference spectrum and the reconstructed difference spectrum, and means for correcting the estimated values by the corrective values. In addition, means are provided for reading out the corrected values of the concentration of the components.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily be utilized as the basis for the design of other apparatus for carrying out the several purposes of the invention. It is important, therefore, that this disclosure be regarded as including such equivalent apparatus as do not depart from the spirit and scope of the invention.

Several embodiments of the invention have been chosen for purposes of illustration and description, and are shown in the accompanying drawings, forming a part of the specification.

DETAILED DESCRIPTION OF THE PREFERRED EMBODIMENTS

Figure 1:
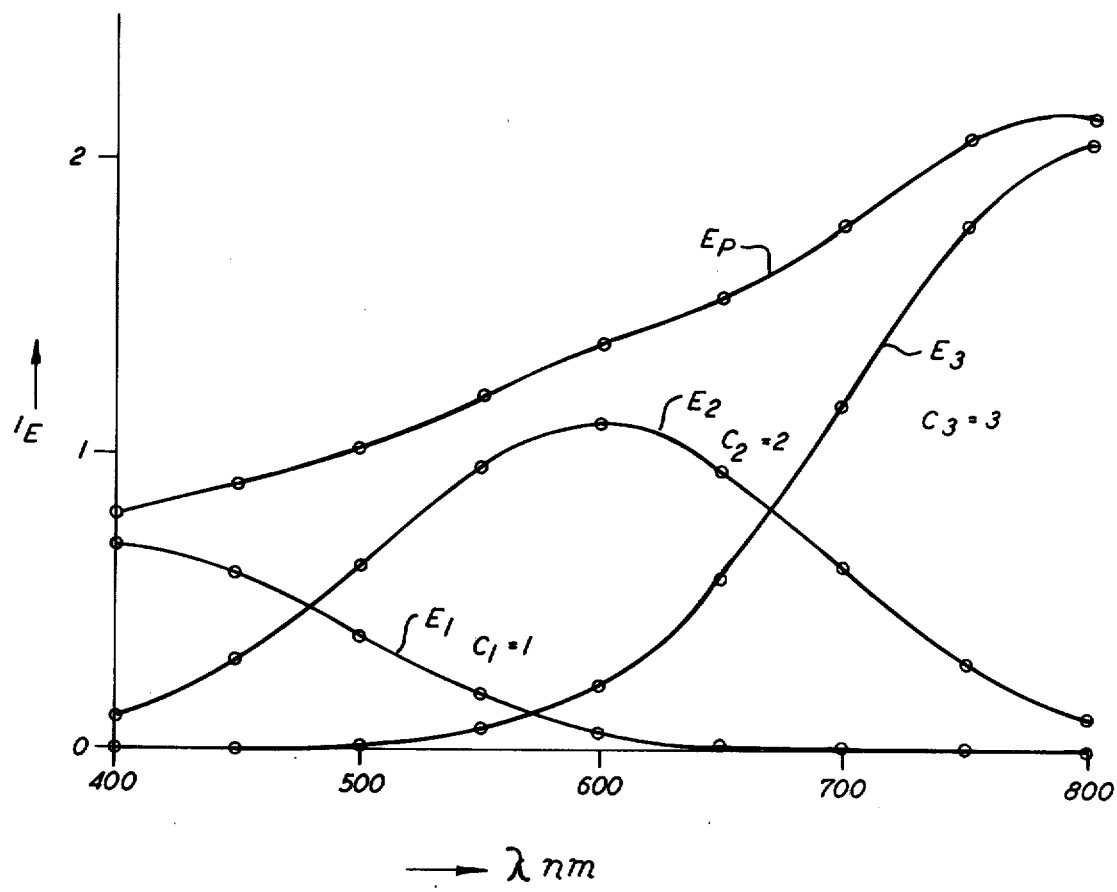
FIG. 1 is a graph showing a sample spectrum and three component spectra, illustrating the invention.

For purposes of explanation, the following symbols will be used:

$E_p(\lambda)$ = extinction spectrum of the sample (sample spectrum)

$E_k(\lambda)$ = extinction spectra of the components $K_k$ contained in the sample with $k = 1, 2 \ldots n$ (component spectra)

$C_k$ = concentration of the component $K_k$ present in the sample for example in milligrams per milliliters (component concentration)

$E_{sk}(\lambda)$ = extinction spectrum of a standard solution of the component $K_k$ (standard spectrum)

$C_{sk}$ = concentration of the standard solution of the component $K_k$ (standard concentration)

$T_k'(\lambda)$ = test diagram $(1/c_{sk}) \cdot E_{sk}(\lambda)$ $\lambda$ = wavelength $\lambda_a$ = beginning of the observed wavelength range $\lambda_e$ = end of the observed wavelength range $a_k$ = proportionality factor $\Delta c_k'$ = first estimated value of the concentration of the component $K_k$ $\Delta c_k^{(x)}$ = corrective value for the estimated value of the concentration (x) = consecutive number of the computing cycles N = number of the computing cycles n = number of the components observed k = consecutive number of the components $R_p^{(x)}(\lambda)$ = difference spectrum $E_p^{(x)}(\lambda)$ = reconstructed spectrum constructed from the corrective values and standard spectra $\lambda_i$ = discrete wavelengths within the wavelength range i = consecutive number of the discrete wavelengths m = number of the discrete wavelengths $E_{pi}$ = extinction of the sample spectrum at wavelength $\lambda_i$ $E_{ki}$ = extinction of the component spectrum at wavelength $\lambda_i$ $E_{ski}$ = extinction of the standard spectrum at the wavelength $\lambda_i$ $T_{ki}'$ = test data for the wavelengths $\lambda_i$ $T_{ki}$ = standardized test data for the wavelengths $\lambda_i$ $E_{pi}^{(x)}$ = value of the reconstructed sample spectrum after computing cycle (x)

$R_{pi}^{(x)}$ = value of the difference spectrum for wavelength $\lambda_i$ at computing cycle (x)

$c_k^{(x)}$ = approximation value of concentration after computing cycle (x).

With the assumption that the extinction values of all sample components are superposed additively without interaction and that the sample is composed exclusively of the n sample components, the following relationship is valid:

$$E_p(\lambda) = \sum_{k=1}^{n} \frac{c_k}{c_{sk}} E_{sk}(\lambda) \quad (1)$$

The component spectrum divided by the standard concentration is to be called "test diagram" $T_k'(\lambda)$:

$$T_k'(\lambda) = \frac{1}{c_{sk}} E_{sk}(\lambda). \quad (2)$$

Thus equation (1) becomes:

$$E_p(\lambda) = \sum_{k=1}^{n} c_k T_k'(\lambda) \quad (3)$$

Furthermore the component spectrum is $$E_k(\lambda) = c_k T_k'(\lambda) \quad (4)$$

thus $$E_p(\lambda) = \sum_{k=1}^{n} E_k(\lambda) \quad (5)$$

In order to determine the proportion of a certain component spectrum, for example $E_1(\lambda)$, in the sample spectrum $E_p(\lambda)$, wavelengths are first considered at which the component spectrum $E_1(\lambda)$ shows strong extinction, whereat the component spectrum has considerable affect on the sample spectrum. At these wavelengths a large value is assigned to the sample spectrum, i.e. it is provided with a large weighted value with respect to the component $K_1$. At wavelengths at which the component spectrum shows only a small extinction, a small value will be assigned to the sample spectrum. Correspondingly, a medium value is assigned to the sample spectrum, where the component spectrum shows medium extinction values.

A similar procedure is applied to the other components.

One—but not the sole—possibility of such an assignment of values, or weighting, comprises taking the product of the sample spectrum $E_p(\lambda)$ and the test diagram $T_1(\lambda)$ and integrating this product over the wavelength range observed. This integral provides, with an appropriate factor $a_1$, an estimated value $\hat{C}_1$ of the concentration $c_1$ of the component $K_1$.

The factor $a_1$ also has to be valid for a single component solution, which contains only one component $K_1$ having the concentration $c_1$. With such a single component solution, the sample spectrum $E_p(\lambda)$ is identical to the component spectrum $E_1(\lambda)$. In this case $$c_1 = a_1 \int_{\lambda_a}^{\lambda_e} E_p(\lambda) T_1'(\lambda) d\lambda. \quad (6)$$

or because of equation (3) and $E_p(\lambda) = E_1(\lambda)$ $$c_1 = a_1 \cdot c_1 \cdot \int_{\lambda_a}^{\lambda_e} T_1'(\lambda)^2 d\lambda \quad (7)$$

and because of equation (2)

$$c_1 = \frac{a_1 \cdot c_1}{c_s^2} \cdot \int_{\lambda_a}^{\lambda_e} E_s(\lambda)^2 d\lambda. \quad (8)$$

so that $a_1$ becomes $$a_1 = \frac{c_s^2}{\int_{\lambda_a}^{\lambda_e} E_s(\lambda)^2 d\lambda} \quad (9)$$

The factors $a_k$ for the other components can be determined in the same manner. It is advisable to take these factors $a_k$ into account in the test diagrams from the beginning and to define "standardized diagrams" $T_k(\lambda)$:

$$T_k(\lambda) = a_k T_k'(\lambda). \quad (10)$$

In accordance with equation (2) this standardized test diagram is obtained from the standard spectrum by $$T_k(\lambda) \frac{c_{sk} E_{sk}(\lambda)}{\int_{\lambda_a}^{\lambda_c} E_{sk}(\lambda)^2 d\lambda} \quad (11)$$

With a single component solution, this test diagram immediately provides the concentration looked for by multiplying $T_k(\lambda)$ by $E_p(\lambda) = E_k(\lambda)$ and integrating over the wavelength range between $\lambda_a$ and $\lambda_c$. With a multicomponent solution the integral $$c_k' = \int_{\lambda_a}^{\lambda_c} E_p(\lambda) T_k(\lambda) d\lambda \quad (12)$$

provides an estimated value of the actual concentration of each component $K_k$. This estimated value $\Delta c_k'$ still differs from the actual concentration $c_k$ as $E_p(\lambda)$ also contains the estinctions of the other components. The component $K_k$ merely has a preferred value assigned to it, while the other components are given less value for the processing in accordance with equation (12). In this way estimated values $\Delta c_1' \ldots \Delta c_n'$ for all n components are formed in accordance with equation (12).

In the second step, a sample spectrum is reconstructed using these estimated values and assuming for calculation that the sample contains only these components. Thus, this reconstructed sample spectrum $E_p'(\lambda)$ is in accordance with equation (3):

$$E_p'(\lambda) = \sum_{k=1}^{n} \Delta c_k' T_k'(\lambda). \quad (13)$$

The next operation is to determine the difference between this reconstructed sample spectrum and the actual measured sample spectrum:

$$R_p'(\lambda) = E_p(\lambda) - E_p'(\lambda). \quad (14)$$

Subsequently, this difference spectrum is further processed in the same manner as the original sample spectrum; it is multiplied by the test diagrams and is integrated over the wavelength range, which yields a corrective value $$\Delta c_k'' = \int_{\lambda_a}^{\lambda_c} R_p'(\lambda) T_k(\lambda) d\lambda \quad (15)$$

to be applied instead of the estimated value $\Delta c_k'$ of the concentration $c_k$.

Again a reconstructed spectrum $$E_p'' = \sum_{k=1}^{n} \Delta c_k'' T_k'(\lambda) \quad (16)$$

is constructed from the corrective values $\Delta c_k''$ thus obtained, and this spectrum is subtracted from the first difference spectrum $R_p(\lambda)$:

$$R_p''(\lambda) = R_p'(\lambda) - E_p''(\lambda). \quad (17)$$

which results in a second difference spectrum $R_p''(\lambda)$. This procedure may be repeated several times. In general, after x steps the following is obtained:

$$\Delta c_k^{(x)} = \int_{\lambda_a}^{\lambda_c} R_p^{(x-1)}(\lambda) \cdot T_k(\lambda) d\lambda. \quad (18)$$

$$R_p^{(x)}(\lambda) = R_p^{(x-1)}(\lambda) - E_p^{(x)}(\lambda) \quad (19)$$

and $$E_p^{(x)}(\lambda) = \sum_{k=1}^{n} \Delta c_k^{(x)} \cdot T_k'(\lambda). \quad (20)$$

If this procedure is repeated N times, with estimated or corrective values $\Delta c_k^{(x)}$ being obtained each time, the concentration of the component $K_k$ will eventually be obtained as $$c_k^N = \sum_{x=1}^{n} \Delta c_k^{(x)} \quad (21)$$

The method in the form described may not converge towards the concentration of the component $K_k$ if the extinction spectra of the various components overlap to a considerable extent. It can be shown, however, that when there is substantial overlapping component spectra, convergence can be achieved by dividing the estimated or corrected values $\Delta c_k^{(x)}$ by values, depending on the number n of components, when forming the reconstructed sample spectra in accordance with equations (13), (16) or (20). With extremely large overlap, division by n would be the best way to achieve quick convergence. With such a large overlap n/2 represents the limit value at which convergence just occurs. On the other hand, the procedure described above, with the reconstructed sample spectra formed in accordance with equations (13), (16) and (20), would be the best, if there were no overlap of the component spectra at all. In this case, equation (12) would immediately provide the actual concentrations $c_k$. Practical cases are somewhere between these extremes, and, hence, it is advantageous to select as divisor the smallest possible value n/2, which also ensures convergence with large overlap. Of course, if there is no overlap, the convergence would be slightly delayed thereby. The divisor n/2 may be applied to the factors $a_k$.

The multiplication, addition and integration of continuous curves requires rather extensive calculations. Such processing of continuous curves is, however, not necessary. It is sufficient to select some discrete wavelengths. The integration is reduced to a simple summation, and the multiplication and subtraction of curves is reduced to the multiplication and subtraction of a plurality of individual values. The continuous curves $E_p(\lambda)$, $E_k(\lambda)$, $E_{sk}(\lambda)$, $T_k'(\lambda)$, $T_k(\lambda)$ and $R_p^{(x)}(\lambda)$ are replaced by sequences of discrete values $E_{pi}'$, $E_{ki}'$, $E_{ski}'$, $T_{ki}'$, $T_{ki}$ and $R_{pi}$ with $i = 1, 2 \ldots m$, m being the number of the selected wavelengths. This results in the following relations:

$$E_{pi} = \sum_{k=1}^{n} E_{ki}. \quad (22)$$

$$T_{ki}' = \frac{1}{c_{sk}} \cdot E_{ski}. \quad (23)$$

-continued $$E_{pi} = \sum_{k=1}^{n} c_k T_{ki}. \quad (24)$$

$$T_{ki} = a_{ki} T_{ki}'. \quad (25)$$

$$a_k = \frac{2c_{sk}^2}{\sum_{i=1}^{n} E_{ski}^2} \quad (26)$$

wherein the "2" from the division by n/2 is incorporated into the $a_k$.

$$T_{ki} = \frac{2c_{sk}E_{ski}}{\sum_{i=1}^{m} E_{ski}} \quad (27)$$

$$\Delta c_k' = \frac{1}{n} \sum_{i=1}^{m} E_{pi} T_{ki}. \quad (28)$$

$$\Delta c_k^{(x)} = \frac{1}{n} \sum_{i=1}^{m} R_{pi}^{(x-1)} T_{ki}. \quad (29)$$

$$R_{pi}^{(x)} = R_{pi}^{(x-1)} - E_{pi}^{(x)} \text{ with } R_{pi}^{(0)} = E_{pi}. \quad (30)$$

$$E_{pi}^{(x)} = \sum_{k=1}^{m} \Delta c_k^{(x)} T_{ki}, \text{ and again} \quad (31)$$

$$c_k^N = \sum_{x=1}^{N} \Delta c_k^{(x)} \quad (32)$$

Prior to the carrying out of an analysis, the component-specific test data have to be measured and stored. A spectrophotometer 40, FIG. 2, having a detector 42 and a digitizer 44 is used to provide a digital output. The various looked-for components $K_k$ in standard solutions with the concentrations $c_{sk}$ are placed consecutively into this spectrophotometer 40. For each component m consecutive measurements are taken at predetermined fixed wavelengths $\lambda_i$ and the associated extinction values $E_{ki}$ are read into memory and stored. About 20 wavelengths $\lambda_i$ uniformly distributed over the wavelength range appears favorable.

With this data, $T_{ki}'$ and $a_k$ or $T_{ki}$ and $a_k$ are calculated in accordance with equations (23) and (26) or equations (27) and (26). Either $a_k$ and the m values of $T_{ki}'$ can be calculated and stored for each component $K_k'$ or $a_k$ and $T_{ki}$ can be calculated and stored. In the former case $T_{ki}'$ has to be multiplied by $a_k$ in accordance with equation (25) during the analysis proper, because $T_{ki}$ is required for equations (28) and (29). In the latter case $T_k'$ has to be divided by $a_k'$ in order to get $T_{ki}'$ for equation (31). It will be assumed hereinbelow that the $T_{ki}'$ are stored.

Preferably, storing of the quantities $a_k$ and $T_{ki}'$ is effected for each component digitally on magnetic cards 46-1, 46-2, 46-3 . . . Such a magnetic card can be used for different analyses in which the respective component is looked for, respectively. The user may establish a "library" with such magnetic cards or magnetic cards may be provided by the manufacturer, each magnetic card corresponding to a specific substance. These magnetic cards can then be combined with each other in various ways depending on the respective analytical problem.

Further, the apparatus includes test data memories 10-1, 10-2, 10-3 . . . . The number of test data memories corresponds to the maximum number of components which can be processed. These test data memories 10-1, 10-2, 10-3 . . . receive the test data $a_k$ and $T_{ki}'$ with i=1,2 . . . m from the magnetic cards 46-1, 46-2, 46-3 . . . , respectively.

In operation, the sample to be analyzed is placed in the spectrophotometer 40 and extinctions of the sample at a number of preselected discrete wavelengths are taken and the results are outputed in the form of digital signals from the digitizer 44. A spectra memory 12 is provided. The extinction values $E_{pi}$ of the sample to be analyzed associated with the m wavelengths $\lambda_1, \lambda_2 \ldots \lambda_m$ are read into this spectra memory 12. The number n of components is read into this memory, for example manually by means of a keyboard 13. The data from the test data memory 10-1, 10-2, 10-3 . . . and from the spectra memory 12 can be read out by a special purpose computing unit 14 which is controlled by a control unit 15, having a single special program memory. The special purpose computing unit 14 is arranged to carry out additions, multiplications and divisions and provides from the data the respective $\Delta c_k^{(x)}$ in accordance with equations (28) or (29). To this end the values $T_{1i}$ pertaining to the same i are read out from the memories 10-1 and 12 and are multiplied with each other. All products thus formed are added, to which end the special purpose computing unit 14 comprises a temporary memory. The sum thus formed is multiplied by the value $a_1$ from the memory 10-1 and is divided by the number n from the memory 12. This yields the estimated value $\Delta c_1'$ of the concentration of the component $K_1$. This estimated value $\Delta c_1'$ is stored in a temporary memory 16.

A second special purpose computing unit 18 reads the value $\Delta c_1'$ out from the temporary memory 16, and reads this value, unchanged in the first computing cycle, into a memory 20-1. During later computing cycles the computing unit 18 will add the respective value $\Delta c_1^{(x)}$ from the temporary memory 16 and the value $\Delta c_1^{(x-1)}$, which has been stored during the preceding computing cycle, and reads the sum $\Delta c_1^{(x)}$ again into the memory 20-1, overwriting the previously stored data.

A computing unit 22 reads out the test date $T_{1i}'$ from the test data memories 10-1 and the value $\Delta c_1'$ from memory 16 and forms the m products $\Delta c_1'T_{1i}'$ which are stored in a memory 24.

Subsequently the same computing process is repeated for k=2: The $T_{2i}$ from the memory 10-2 and the $R_i^{(1)}$ from the memory 12 pertaining to the same i are read out and multiplied, the products are summed and the sum is multiplied by $a_2$ from memory 10-2 and is divided by n from memory 12. The $\Delta c_2'$ thus formed is stored in the temporary memory 16 and is read by the special purpose computing unit 18 into a memory 20-2, unchanged within the first computing cycle. The computing unit 22 forms the products $\Delta c_2'T_{2i}'$ with $\Delta c_2'$ from memory 16 and the $T_{2i}$ from the memory 10-2. These products $\Delta c_2'T_{2i}'$ are added by the computing unit 22 to the associated values $\Delta c_1'T_{1i}'$, which had been stored in the memory 24 previously. The sums $\Delta c_1'T_{11}' + \Delta c_2'T_{21}'$, $\Delta c_1'T_{12}' + \Delta c_2'T_{22}'$ etc. (generally $\Delta c_1'T_{1i} + \Delta c_2'T_{2i}$) are read into the memory 24, overwriting the data stored previously.

The same operation is repeated for k=3, k=4 . . . , i.e. for all components, the test data being read out from the test data memories 10-3, 10-4 etc., and the $\Delta c_k'$ being read into memories 20-3, 20-4 . . . After this operation has been performed for all k, the memories 20-1, 20-2 .

... contain the first estimated values $\Delta c_1'$ of the concentrations, and the memory 24 contains the $E_{pi}'$ in accordance with equation (31).

Subsequently a subtractor 26 forms the difference from the values $R_{pi}^{(1)} = E_{pi}$ from the memory 12 and the associated values $E_{pi}$ from the memory 24. These differences, which represent the difference spectrum, are read into the memory 12, the previous values being overwritten. The contents of the memory 24 is erased.

This whole operation is now repeated during a second cycle of operation. At the end of the second cycle the memories 20-1, 20-2 ... contain the second approximation values $c_1^{(2)}, c_2^{(2)}, c_3^{(2)}$ ... of the concentrations and the memory 12 contains the second difference spectrum $R_i^{(2)}$.

Further cycles are run correspondingly, the approximation values $c_k^{(x)}$ appearing in the memories 20-1, 20-2 ... and the difference spectrum $R_i^{(x)}$ appearing in the memory 12 after the computing cycle having the consecutive number x. After a sufficient number of operating cycles, the operation will be discontinued. Then, the memories 20-1, 20-2 ... contain the looked-for concentrations $c_k$ with sufficient accuracy, and can be read out as indicated at 21-1, 21-2, 21-3, ...

Figure 2:
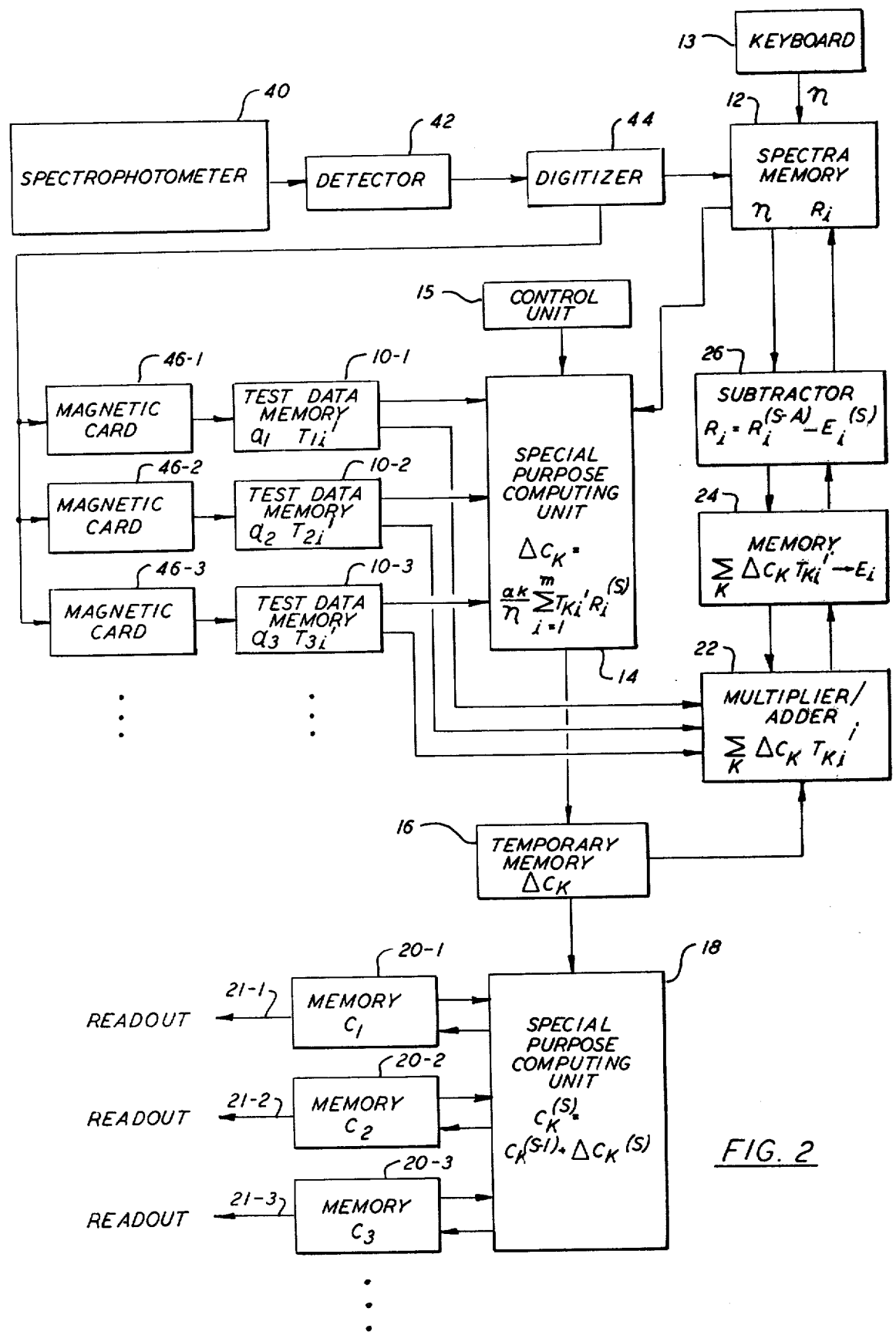
FIG. 2 is a schematic block diagram showing one form of apparatus for determining the concentrations of the various components of a sample.
Figure 3:
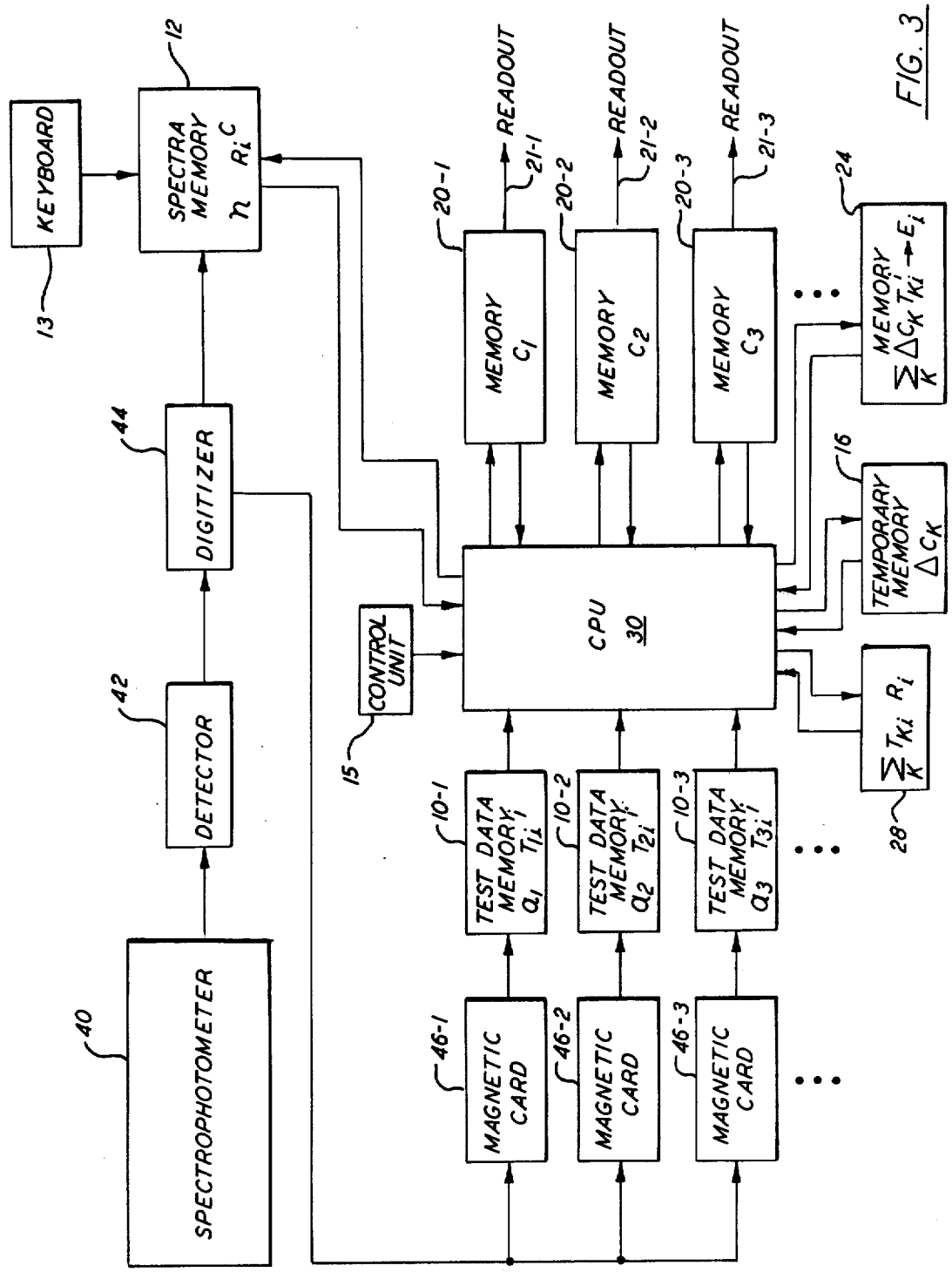
FIG. 3 is a schematic block diagram similar to FIG. 2, but showing another embodiment of the invention.

FIG. 3 shows another embodiment of the invention wherein one single central computing unit 30 is provided, said unit being adapted to apply the four fundamental rules of arithmetic and being controlled by a control unit 15 to carry out the described operations consecutively. Corresponding elements are designated by the same reference numerals and function in a similar manner in FIGS. 2 and 3. The spectra analyzer of FIG. 3 comprises the same memories 10-1, 10-2, 10-3 for the test data, 20-1, 20-2, 20-3 ... for the approximation values of the concentrations, 16 for the estimated value $\Delta c_k'$ or the corrective value $\Delta c_k^{(x)}$ of the concentrations and 24 for forming the reconstructed sample spectrum. A further temporary memory 28 for forming the product sum $$\sum_k T_{ki} R_i^{(x)}$$

is provided, which, as mentioned above, forms part of the computing unit 14 in the embodiment of FIG. 2.

FIG. 1 illustrates the mode of operation of the apparatus of the invention with reference to an example of three components. The bands of component spectra $E_1, E_2$ and $E_3$ overlap to such an extent that the three bands are no longer separated in the sample spectrum $E_p$, i.e. there are no genuine minima between the band maxima. Only the maximum of the very strong third component $K_3$ can be recognized, slightly displaced, in the sample spectrum. The maximum of the second component $K_2$ is only hinted at by a barely recognizable slight undulation, and the maximum of the weak first component cannot be recognized at all.

The observed wavelength range extends from $\lambda_a = 400$ nm to $\lambda_v = 800$ nm. The spectra are observed at the nine wavelengths $\lambda_1 = 400$ nm, $\lambda_2 = 450$ nm, $\lambda_3 = 500$ nm ... $\lambda_8 750$ nm, $\lambda_9 = 800$ nm. Thus m = 9. The maxima of the three component spectra (thus n = 3) are located at 400 nm, 600 nm and 800 nm. The concentrations of the three components have been assumed as $c_1 = 1$, $c_2 = 2$ and $c_3 = 3$. The operating cycles described provide the following results, x being the consecutive numbers of the cycles and $R_{max}$ being the respective maximum value of the difference spectrum:

| x | $c_1^x$ | $\Delta c_1/c_1$ per cent | $c_2^x$ | $\Delta c_2/c_2$ per cent | $c_3^x$ | $\Delta c_3/c_3$ per cent | $R_{max}$ |
|---|---|---|---|---|---|---|---|
| 1 | 1.206 | 20.6 | 2.351 | 17.6 | 2.519 | 16.0 | 308 |
| 2 | 0.984 | −1.6 | 2.187 | 9.3 | 2.748 | 8.4 | 161 |
| 3 | 0.950 | −5.0 | 2.130 | 6.5 | 2.869 | −4.4 | 82 |
| 4 | 0.951 | −4.9 | 2.090 | 4.5 | 2.924 | −2.5 | 47 |
| 5 | 0.961 | −3.8 | 2.062 | 3.1 | 2.952 | −1.6 | 29 |
| 6 | 0.972 | −2.8 | 2.042 | 2.1 | 2.969 | −1.0 | 19 |
| 7 | 0.980 | −2.0 | 2.029 | 1.5 | 2.979 | −0.7 | 13 |
| 8 | 0.986 | −1.4 | 2.020 | 1.0 | 2.986 | −0.5 | 9 |
| 9 | 0.990 | −1.0 | 2.014 | 0.7 | 2.990 | −0.3 | 6 |
| 10 | 0.993 | −0.7 | 2.010 | 0.5 | 2.993 | −0.2 | 4 |
| 11 | 0.995 | −0.5 | 2.007 | 0.3 | 2.995 | −0.15 | 3 |
| 12 | 0.997 | −0.3 | 2.005 | 0.2 | 2.997 | −0.10 | 2 |
| 13 | 0.998 | −0.2 | 2.003 | 0.16 | 2.998 | −0.07 | 1.4 |
| 14 | 0.999 | −0.15 | 2.002 | 0.11 | 2.999 | −0.05 | 1.0 |
| 15 | 0.999 | −0.10 | 2.001 | 0.07 | 2.999 | −0.03 | 0.7 |

The convergence of the $c_k^{(x)}$ towards the values 1, 2 and 3 will be noticed. This convergence permits drawing conclusions with respect to the quality of the approximation from the difference of consecutive approximation values. The convergence of the approximation values is very good, independent of the amount of the difference spectrum. This difference spectrum may give an indication to a non-considered component in the sample.

Having thus described the invention with particular reference to the preferred forms thereof, it will be obvious to those skilled in the art to which the invention pertains, after understanding the invention that various changes and modifications may be made therein without departing from the spirit or scope of the invention, as defined by the claims appended hereto.

What is claimed is:

1. Apparatus for determining the concentration of the various components of a sample comprising, in combination, a spectrophotometer for receiving a sample to be analyzed and performing a fixed number of extinctions of the sample at fixed wavelengths to form a sample spectrum;

means for forming and storing spectra in standardized form of each of the individual components, by the extinction of standard solutions of the components being looked for, having said fixed number of extinction values measured at said fixed wavelengths;

means for weighting the sample spectrum at different wavelengths in conformity with each of the standard spectra and providing estimated values of the concentrations of the components from the sample spectra thus weighted;

means for reconstructing the sample spectrum as a linear combination of the estimated values of the concentrations and the standard spectra;

means for forming a difference spectrum from the sample spectrum and the reconstructed sample spectrum;

means for weighting the difference spectrum at different wavelengths in conformity with each of the standard spectra and providing corrective values of the concentrations of the components from the difference spectrum thus weighted;

means for reconstructing the difference spectrum as a linear combination of the corrective values of the concentrations and the standard spectra;

means for forming a second difference spectrum from the first difference spectrum and the reconstructed difference spectrum;

means for correcting the estimated values by the corrective values; and means for reading out the corrected values of the concentration of the components.

2. Apparatus for determining the concentration of the various components of a sample according to claim 1, wherein said means for weighting the sample spectrum comprises means for integrating the product of the sample spectrum and a respective one of the standard spectra through a predetermined wavelength range.

3. Apparatus for determining the concentration of the various components of a sample comprising, in combination, a spectrophotometer for receiving a sample to be analyzed and performing a fixed number of extinctions of the sample at fixed discrete wavelengths to form a sample spectrum;

means for forming and storing a spectra in standardized form of each of the individual components, by the extinction of standard solutions of the components being looked for, having said fixed number of extinction values measured at said fixed discrete wavelength;

means for weighting the sample spectrum at different wavelengths in conformity with each of the standard spectra and providing estimated values of the concentrations of the components from the sample spectra thus weighted, said last named means including means for summing the products of the extinctions of the sample spectrum and the standard spectra;

means for reconstructing the sample spectrum from the extinction values for the predetermined discrete wavelengths as a linear combination of the associated values of the standard spectra and of the estimated values of the concentration;

means for forming a difference spectrum from the differences of the extinctions of the sample spectrum and the associated computed extinction values of the reconstructed sample spectrum at the preselected discrete wavelengths;

means for weighting the difference spectrum at different wavelengths in conformity with each of the standard spectra and providing corrective values of the concentrations of the components from the difference spectrum thus weighted;

means for reconstructing the difference spectrum as a linear combination from the corrective values of the concentrations and the standard spectra;

means for forming a second difference spectrum from the first difference spectrum and the reconstructed difference spectrum;

means for correcting the estimated values by the corrective values; and means for reading out the corrected values of the concentration of the components.

4. Apparatus for determining the concentration of the various components of a sample according to claim 3, wherein said means for forming and storing a standard spectra of each of the individual components includes magnetic cards.

* * * * *